United States Patent
Larsson et al.

(10) Patent No.: US 6,224,330 B1
(45) Date of Patent: May 1, 2001

(54) FLUID COUPLING

(75) Inventors: Per Larsson, Göteborg; Mikael Swanteson, Lund, both of (SE)

(73) Assignee: Ab Volvo, Göteborg (SE)

( * ) Notice: Subject to any disclaimer, the term of this patent is extended or adjusted under 35 U.S.C. 154(b) by 0 days.

(21) Appl. No.: 09/194,683
(22) PCT Filed: Jun. 2, 1997
(86) PCT No.: PCT/SE97/00952
  § 371 Date: Dec. 1, 1998
  § 102(e) Date: Dec. 1, 1998
(87) PCT Pub. No.: WO97/46811
  PCT Pub. Date: Dec. 11, 1997

(30) Foreign Application Priority Data

Jun. 3, 1996 (SE) .................................................. 9602185

(51) Int. Cl.⁷ .................................................. F01D 25/00
(52) U.S. Cl. .................................. 415/121.1; 415/169.1; 416/197 C
(58) Field of Search .............................. 415/121.1, 169.1, 415/121.2; 416/180, 197 C; 60/336

(56) References Cited

U.S. PATENT DOCUMENTS

| 2,510,898 | 6/1950 | Meloy | 60/336 |
| 2,783,615 | * 3/1957 | Gooch et al. | 60/336 |
| 2,977,766 | 4/1961 | Sand | 60/336 |
| 4,073,139 | 2/1978 | Armasow | 60/364 |

FOREIGN PATENT DOCUMENTS

| 9202578 U 1 | 5/1992 | (DE) . |
| 176838 | 10/1961 | (SE) . |

* cited by examiner

Primary Examiner—Edward K. Look
Assistant Examiner—Richard Woo
(74) Attorney, Agent, or Firm—Burns, Doane, Swecker & Mathis L.L.P.

(57) ABSTRACT

In a fluid coupling including a casing enclosing an impeller and a turbine wheel which is rotatably mounted in the casing, the turbine wheel is formed on its face turned toward the casing with scrapers designed to scrape off impurities that have settled on the inner wall of the casing.

6 Claims, 2 Drawing Sheets

FLUID COUPLING

TECHNICAL FIELD

The present invention relates to a fluid coupling to be used for instance in turbo compound systems in motor vehicles.

BACKGROUND

In order to extract energy from engine exhaust gases, turbo chargers are often used, said chargers consisting of an exhaust-gas driven turbine which drives a compressor in order to compress the intake combustion air to the engine, thus supercharging the latter. In order to recover part of the residual energy of the exhaust gases an arrangement known as a turbo compound system is sometimes placed downstream from the turbo charger. Such a turbo compound system consists of a second exhaust-gas driven turbine which mechanically transfers energy to the engine drive shaft or the like.

In order to prevent torsional vibration that occurs in the exhaust turbine from intermingling with the engine vibrations a fluid coupling is advantageously used.

In connection with turbo compound systems the use of conventional fluid couplings, wherein circulates a contained volume of liquid, has, however, been found unsuitable, on the one hand for sealing reasons and on the other on account of the considerable thermal stress that is generated in such systems.

In order to solve this problem, the use of through-flow fluid couplings has been suggested, wherein oil from the engine lubricating system is used as a combined working and cooling medium.

A disadvantage inherent in this solution is, however, that the impurities contained in the engine lubricating oil may settle on the coupling proper. These problems are considerably aggravated if the impurities settle on the inner face of the casing, thereby preventing the rotation therein of the turbine wheel. Should the coupling for this reason become stiff, a drastically increase of the working temperature in the coupling results, with consequential risks for damages to the coupling itself as well as to the transmission connected thereto.

Solutions to the problem of sedimentation of impurities are given e.g. in U.S. Pat. No. 2,510,898 describing a fluid coupling the turbine wheel of which is provided with protruding agitators arranged to increase the movability of the liquid in front of the outlet. In the subject case, this solution is, however, inadequate.

OBJECT OF THE INVENTION

The object of the present invention is to provide a fluid coupling that is capable of completely or partly eliminating the drawbacks outlined in the aforegoing while at the same time being operationally reliable and easy to manufacture.

This object is achieved in a fluid coupling according to the present invention.

BRIEF DESCRIPTION OF THE DRAWINGS

In the accompanying drawings.

DESCRIPTION OF PREFERRED EMBODIMENTS

For exemplifying purposes the invention will be described in closer detail by way of one embodiment and with reference to the accompanying drawings.

Figure 1:
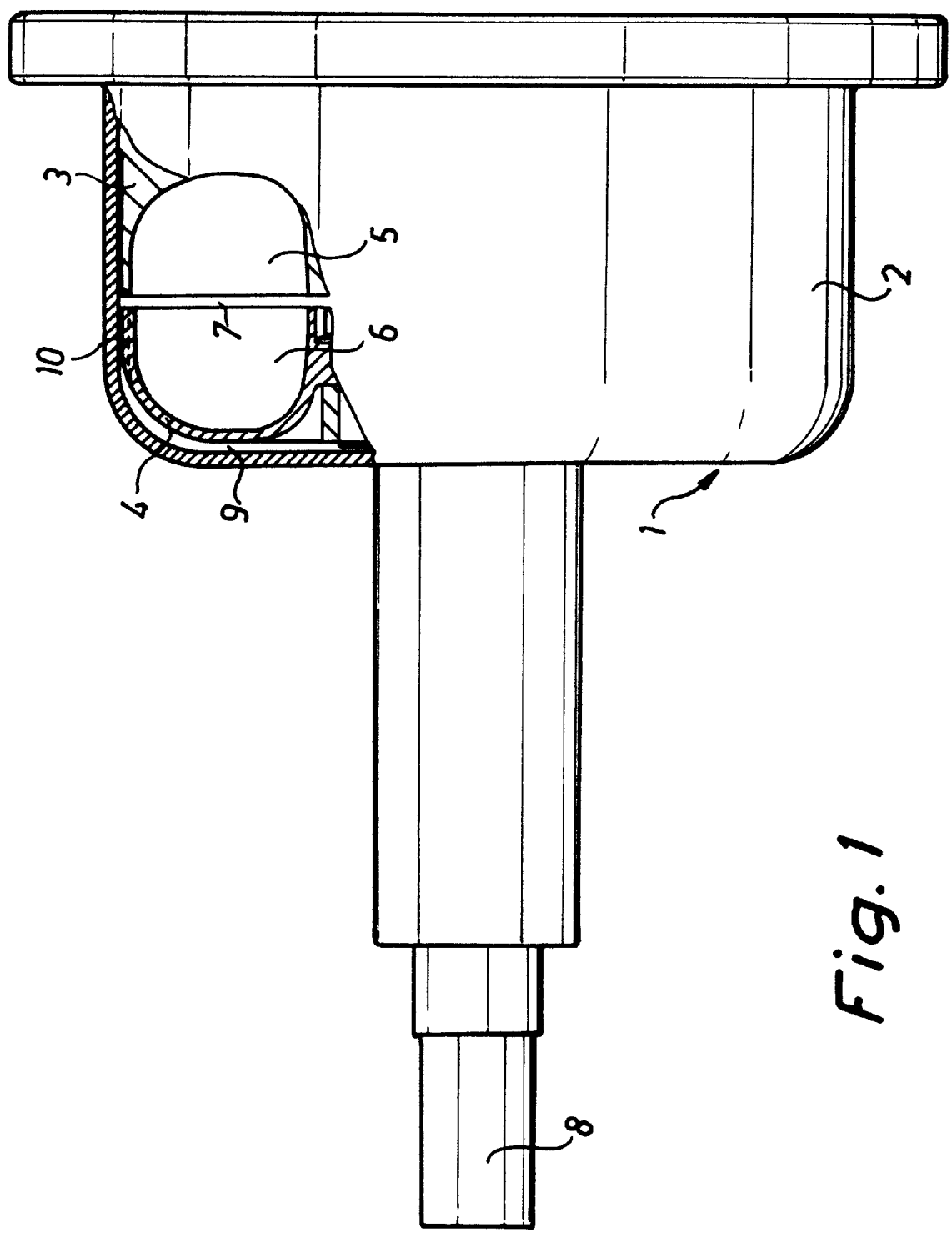
FIG. 1 is a partly sectionalized view of a fluid coupling in accordance with the invention.

FIG. 1 illustrates a fluid coupling 1 comprising an external casing 2. Inside the casing, which in itself is rotatable, is rigidly mounted an impeller 3 with blades 5 thereon. In addition, a turbine wheel 4 with blades 6 thereon is rotatably mounted inside the casing 2. The impeller 3 as well as the turbine wheel 4 are configured as blade wheels having one open side, said open side extending perpendicularly to the direction of rotation. Inside the casing 2 these open sides of the respective blade wheel face one another and are spaced apart by a gap 7.

The casing 2 is driven in a rotary motion by a direct or indirect coupling by means of a driving assembly, which could be e.g. an exhaust-gas-driven turbine. The casing also containes a liquid, for instance oil from the engine lubricating system. Upon rotary motion of the casing 2, the blades 5 of the impeller 3 together with the centrifugal force urge the enclosed liquid towards the open impeller side while at the same time imparting high kinetic energy to the liquid. This energy is thereafter transferred in part to the turbine wheel 4, as the liquid in transfer causes the wheel to rotate. In addition, the turbine wheel 4 is coupled to the output shaft 8 which is rotatably mounted relative to the casing 2.

In the case of a through-flow fluid coupling, cool liquid thus flows from an inlet adjacent the impeller 3 to the turbine wheel 4. In doing so, the liquid is heated, whereupon it is drawn off behing the turbine wheel 4.

A space 9 is formed intermediate the casing 2 and the turbine wheel 4, allowing the turbine wheel to rotate freely inside the casing and also forming a flow path for the liquid in case a coupling of through-flow type is used.

Should this space be clogged by impurities settling on the inner wall of the casing, such clogging will restrict the flow, and in turn such restriction will result in impaired cooling effects as also in an increased risk for damages to the coupling. In addition, such clogging involves a risk of interference with, or even prevention of, the rotary motion of the turbine wheel relative to the casing 2, which also could lead to serious damages.

Figure 2:
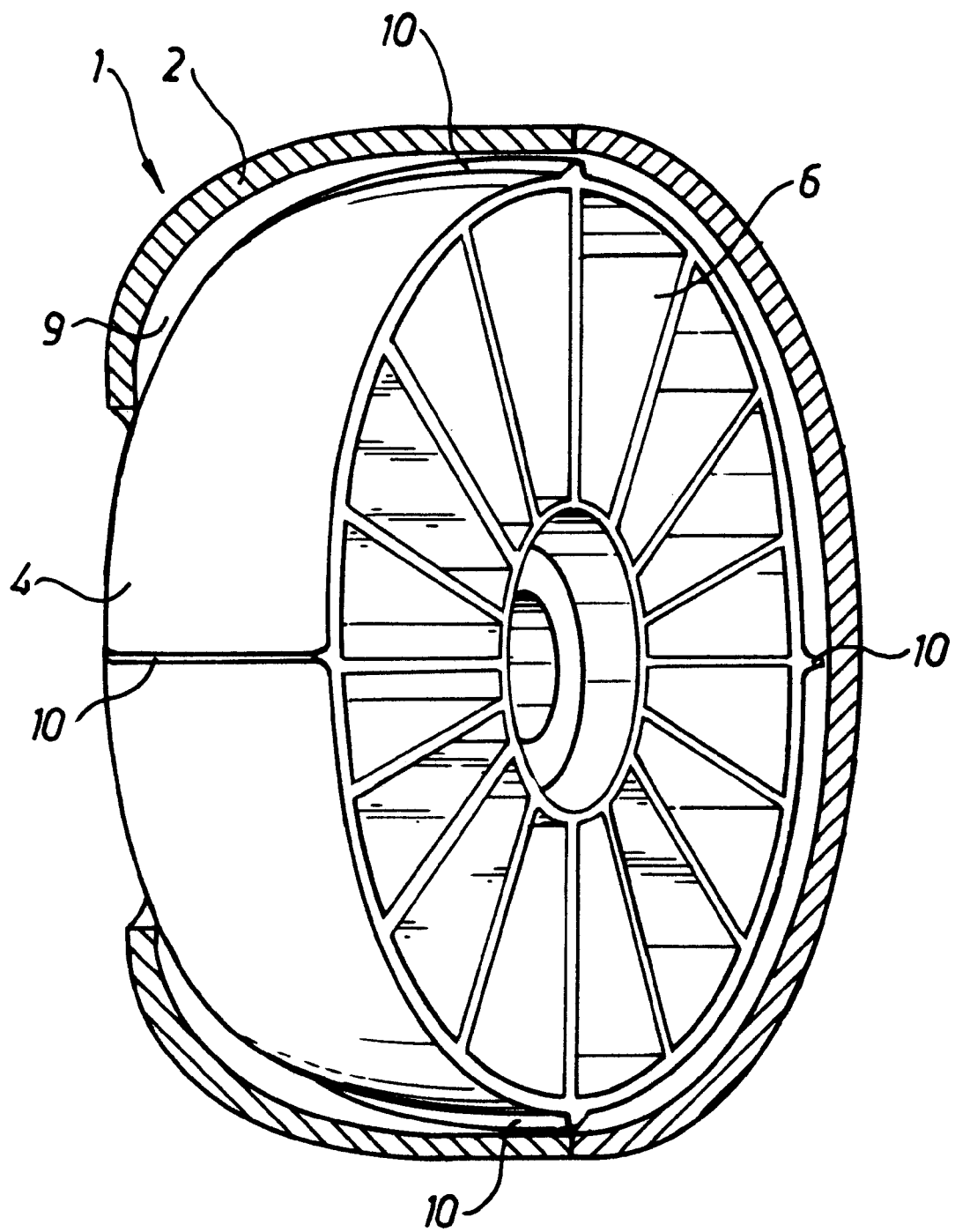
FIG. 2 shows the turbine wheel of FIG. 1 together with a sectionalized part of the casing.

In order to solve this problem, protroding scraper means 10 may be provided on the turbine wheel 4, as illustrated in FIG. 2.

The scraper means 10 may be in the form of four protrusions formed integrally on the turbine wheel 4, said protrusions extending perpendicularly to the direction of rotation of the turbine wheel and essentially across the entire external face of the turbine wheel.

As the turbine wheel 4 rotates relative to the casing 2 the scraper means will scrape off impurities that have settled on the inner face of the casing in excess of a predetermined thickness. In this manner the amount of settled impurities will be kept in check while at the same time a satisfactory level of through-flow in the space between the scraper means 10 will be maintained at all times.

The thickness of the remaining layer of impurity deposits is defined by the spacing from the scraper means 10 to the inner wall of the casing 2.

Furthermore, the frictional force preventing relative movement between the turbine wheel 4 and the casing 2 will be reduced as a result of the smaller area of contact that the scraper means 10 offer with respect to the impurity sedimentation compared with the case when no such means are provided.

The scraper means need not, however, be configured as described in the aforegoing but several other modified embodiments are possible. For instance, the scraper means need not extend across the entire external face of the turbine wheel but in many cases some parts thereof suffice. In addition, the number of scraper means does not necessarily have to be four, a larger or smaller number of such means being equally possible. The external scraping face of the means could also be configured in different ways. For instance, this face could be essentially flat, be sloping, pointed or the like. As mentioned previously, the scraper means may be formed integrally with the turbine wheel and preferably they are formed together with the latter in the casting operation, but removable varieties are feasable, such as removable scraper means that are secured in position by being inserted in and held by bevelled grooves. Finally, the scraper means need not extend perpendicularly to the direction of movement of the turbine wheel but could equally well extend obliquely thereto. For instance, helically extending scraper means are possible.

These and other embodiment modifications must be regarded to fall within the scope of protection as defined in the appended claims.

What is claimed is:

1. A fluid coupling comprising:

a casing;

an impeller enclosed in the casing;

a turbine wheel rotatably mounted in the casing; and one or more scrapers provided on an external face of the turbine wheel that is turned towards the casing, the one or more scrapers being arranged to scrape off impurities that settle on an inner wall of the casing, the one or more scrapers extending at an angle to a direction of rotation of the turbine wheel.

2. A fluid coupling as claimed in claim 1, wherein the one or more scrapers extend across a substantial part of a length of the turbine wheel perpendicularly to the direction of rotation.

3. A fluid coupling as claimed in claim 2, wherein the fluid coupling is of through-flow type.

4. A fluid coupling as claimed in claim 3, wherein the fluid coupling forms part of a turbo compound system in a motor vehicle, a fluid in the fluid coupling being oil from a engine lubricating system.

5. A fluid coupling as claimed in claim 1, wherein the fluid coupling is of through-flow type.

6. A fluid coupling as claimed in claim 5, wherein the fluid coupling forms part of a turbo compound system in a motor vehicle, a fluid in the fluid coupling being oil from an engine lubricating system.

* * * * *